United States Patent
Fujita et al.

(10) Patent No.: US 10,252,192 B2
(45) Date of Patent: Apr. 9, 2019

(54) FILTER MEDIUM, FILTERING DEVICE USING FILTER MEDIUM, AND FILTER MEDIUM MANUFACTURING METHOD

(75) Inventors: Kunio Fujita, Kagawa-ken (JP); Hidetaka Ujike, Kagawa-ken (JP); Takahiko Ishimaru, Kagawa-ken (JP); Fumikatsu Nagai, Aichi-ken (JP)

(73) Assignee: ISHIGAKI COMPANY LIMITED, Tokyo (JP)

( * ) Notice: Subject to any disclaimer, the term of this patent is extended or adjusted under 35 U.S.C. 154(b) by 328 days.

(21) Appl. No.: 13/990,267

(22) PCT Filed: Oct. 6, 2011

(86) PCT No.: PCT/JP2011/073062
§ 371 (c)(1),
(2), (4) Date: May 29, 2013

(87) PCT Pub. No.: WO2012/077402
PCT Pub. Date: Jun. 14, 2012

(65) Prior Publication Data
US 2013/0248439 A1    Sep. 26, 2013

(30) Foreign Application Priority Data
Dec. 6, 2010 (JP) ................... 2010-271779

(51) Int. Cl.
*B01D 29/00* (2006.01)
*D02G 3/42* (2006.01)
*B01D 39/16* (2006.01)
*B01D 39/08* (2006.01)

(52) U.S. Cl.
CPC ....... *B01D 29/0027* (2013.01); *B01D 39/083* (2013.01); *B01D 39/163* (2013.01); *D02G 3/42* (2013.01); *B01D 2239/0233* (2013.01); *B01D 2239/064* (2013.01); *B01D 2239/086* (2013.01); *D10B 2401/041* (2013.01); *D10B 2505/04* (2013.01)

(58) Field of Classification Search
None
See application file for complete search history.

(56) References Cited

FOREIGN PATENT DOCUMENTS

| CN | 2075100 | 4/1991 |
| CN | 1498667 | 5/2004 |
| CN | 1550831 | 12/2004 |
| JP | 02-200829 | 8/1990 |
| JP | 05-092196 | 4/1993 |
| JP | 07-328354 | 12/1995 |
| JP | 10-118427 | 5/1998 |

(Continued)

OTHER PUBLICATIONS

Japan Office Action, dated Nov. 26, 2013 along with an English language translation thereof.

*Primary Examiner* — Benjamin M Kurtz
(74) *Attorney, Agent, or Firm* — Greenblum & Bernstein, P.L.C.

(57) ABSTRACT

A filter medium includes: a core yarn and a binder yarn twisted together, at least one of the core yarn or the binder yarn being weldable; and a filament yarn being fuzzy and weldable, the filament yarn being welded to at least one of the core yarn or the binder yarn while being placed between the core yarn and the binder yarn as twisted together. A filtering device for filtering a liquid to be treated with a filter medium layer includes the filter medium. A method of manufacturing the filter medium is also disclosed.

6 Claims, 7 Drawing Sheets

(56) References Cited

FOREIGN PATENT DOCUMENTS

| | | |
|---|---|---|
| JP | 11-151405 | 6/1999 |
| JP | 3994392 | 10/2007 |
| JP | 4029781 | 1/2008 |

FILTER MEDIUM, FILTERING DEVICE USING FILTER MEDIUM, AND FILTER MEDIUM MANUFACTURING METHOD

TECHNICAL FIELD

The present invention relates to a filter medium configured to filter out suspended matters contained in water to be treated such for example as domestic wastewater or industrial wastewater (liquid waste), a filtering device using the filter medium, and a filter medium manufacturing method of manufacturing the filter medium.

BACKGROUND ART

Porous granular fibrous filter media are often used in solid-liquid separators and biotreatment apparatuses.

As an example of such filter media, PTL 1 proposes a filter medium in which a core yarn and a binder yarn, at least one of which is weldable, are twisted together with filament yarns placed between the core yarn and the binder yarn.

As another example, PTL 2 proposes a filter medium in which a core yarn and a binder yarn each blended with a bonding yarn are twisted together with filament yarns placed between the core yarn and the binder yarn. The filter media described above have the advantages of being lightweight, easy to handle, and easy to clean.

CITATION LIST

Patent Literature

[PTL 1] Japanese Patent No. 3994392
[PTL 2] Japanese Patent No. 4029781

SUMMARY OF INVENTION

However, the relevant filter media described above sometimes fray with cleaning.

In addition, since the filter media become worn and thin with repeated cleaning, the filtering efficiency of the filter media deteriorates with repeated cleaning.

An object of the present invention is to provide: a filter medium which is less likely to fray (a filament yarn of which is less likely to fall out), captures suspended matters easily, and has high capture efficiency for suspended matters; a filtering device using the filter medium; and a filter medium manufacturing method of manufacturing the filter medium.

A first aspect of the present invention is a filter medium including: a core yarn and a binder yarn twisted together, at least one of the core yarn or the binder yarn being weldable; and a filament yarn being fuzzy and weldable, the filament yarn being welded to at least one of the core yarn or the binder yarn while being placed between the core yarn and the binder yarn as twisted together.

The filament yarn may be a yarn made by twisting and raising a plurality of short fibers.

The filament yarn and at least one of the core yarn or the binder yarn may be each formed of a twisted yarn made by blending a resin short fiber and a core-sheath-structure resin short fiber and twisting the resin short fiber and the core-sheath-structure resin short fiber with directions of the resin short fiber and the core-sheath-structure resin short fiber being aligned, the resin short fiber being formed of a first resin having a melting point of a first fusing temperature, the core-sheath-structure resin short fiber being formed of a second resin as a sheath having a melting point of a second fusing temperature lower than the first fusing temperature and a third resin as a core having a melting point of a third fusing temperature equal to or higher than the second fusing temperature.

According to the filter medium of the above configuration, the filament yarn is a fuzzy yarn. Accordingly, favorable porosity can be secured, and thus suspended matters can be captured efficiently.

In addition, since the filament yarn and at least one of the core yarn or the binder yarn are weldable, the filament yarn can be welded to the core yarn and the binder yarn firmly. Thereby, the filter medium is less likely to fray and the filament yarn is less likely to fall out with cleaning. As a consequence, the lifetime of the filter medium can be increased.

A second aspect of the present invention is a filtering device for filtering a liquid to be treated with a filter medium layer provided in a filtration tank, wherein the filter medium layer includes filter media, and each of the filter media includes: a core yarn and a binder yarn twisted together, at least one of the core yarn or the binder yarn being weldable; and a filament yarn being fuzzy and weldable, the filament yarn being welded to at least one of the core yarn or the binder yarn while being placed between the core yarn and the binder yarn as twisted together.

The filament yarn may be a yarn made by twisting and raising a plurality of short fibers.

The filament yarn and at least one of the core yarn or the binder yarn may be each formed of a twisted yarn made by blending a resin short fiber and a core-sheath-structure resin short fiber and twisting the resin short fiber and the core-sheath-structure resin short fiber with directions of the resin short fiber and the core-sheath-structure resin short fiber being aligned, the resin short fiber being formed of a first resin having a melting point of a first fusing temperature, the core-sheath-structure resin short fiber being formed of a second resin as a sheath having a melting point of a second fusing temperature lower than the first fusing temperature and a third resin as a core having a melting point of a third fusing temperature equal to or higher than the second fusing temperature.

According to the filtering device of the above configuration, suspended matters can be captured efficiently by the fuzzy filament yarn. Thus, water to be treated can be filtered efficiently.

A third aspect of the present invention is a method of manufacturing a filter medium, the method including: making a twisted yarn by blending a resin short fiber and a core-sheath-structure resin short fiber and twisting the resin short fiber and the core-sheath-structure resin short fiber with directions of the resin short fiber and the core-sheath-structure resin short fiber being aligned, the resin short fiber being formed of a first resin having a melting point of a first fusing temperature, the core-sheath-structure resin short fiber being formed of a second resin as a sheath having a melting point of a second fusing temperature lower than the first fusing temperature and a third resin as a core having a melting point of a third fusing temperature equal to or higher than the second fusing temperature; manufacturing a chenille yarn by twisting together a core yarn and a binder yarn at least one of which is formed of the twisted yarn while placing the twisted yarn, as a filament yarn, between the core yarn and the binder yarn; cutting the filament yarn to a predetermined length; heating the chenille yarn to the second fusing temperature and thereby welding the core yarn, the binder yarn, and the filament yarn together; and cutting the chenille yarn as heated to a predetermined length.

The core yarn and the binder yarn may be both formed of the twisted yarn.

The first resin and the third resin may be resins of the same type.

A surface of the first resin may be softened when the first resin is heated to the second fusing temperature.

The first resin and the second resin may be resins of the same family.

The filament yarn may be formed of the twisted yarns bundled together in a plurality.

According to the filter medium manufacturing method above, the twisted yarn constituting the filament yarn is welded firmly inside itself as well as welded to the core yarn and the binder yarn at least one of which is weldable, by heating the chenille yarn to the second fusing temperature. Thereby, the filter medium is less likely to fray and the filament yarn is less likely to fall out with cleaning. As a consequence, the lifetime of the filter medium can be increased. In addition, heating the chenille yarn to the second fusing temperature fuzzes the filament yarn, which secures favorable porosity. Thus, suspended matters can be captured efficiently.

BRIEF DESCRIPTION OF DRAWINGS

FIG. 3(*a*) and FIG. 3(*b*) are views for explaining the filter medium and the filter medium manufacturing method according to the embodiment of the present invention; FIG. 3(*a*) is a vertical cross-sectional view of a twisted yarn; and FIG. 3(*b*) is a cross-sectional view of the twisted yarn taken along the 3B-3B line of FIG. 3(*a*).

FIG. 6 is views for explaining the filter medium and the filter medium manufacturing method according to the embodiment of the present invention; FIG. 6(*a*) is a side view of the chenille yarn; and FIG. 6(*b*) is a view of the chenille yarn of FIG. 6(*a*) seen from the right side.

DESCRIPTION OF EMBODIMENTS

Embodiments of the present invention are described in detail below with reference to the drawings.

FIGS. 1 to 7 are views for explaining a filter medium and a filter medium manufacturing method according to an embodiment of the present invention.

Figure 1:
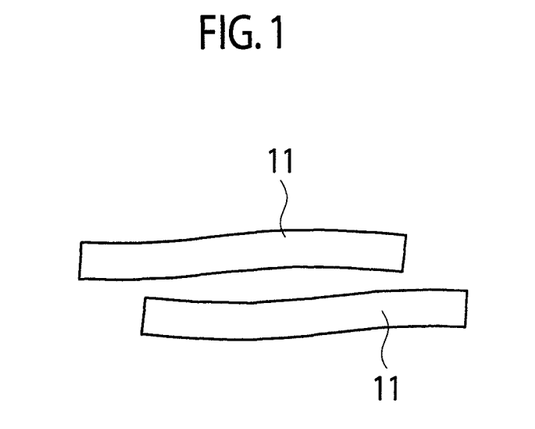
FIG. 1 is a view (a cross-sectional view of a polyester fiber) for explaining a filter medium and a filter medium manufacturing method according to an embodiment of the present invention.

In FIG. 1, high-melting-point polyester fibers (resin stable fibers) 11 are made by: cutting, for example, high-melting-point polyesters (first resins) with a fusing temperature of 220° C. (a first fusing temperature) to, for example, 20 to 100 mm in length and with a fineness of 0.5 to 20 deniers (an optimum value is 1 to 6 deniers).

Figure 2:
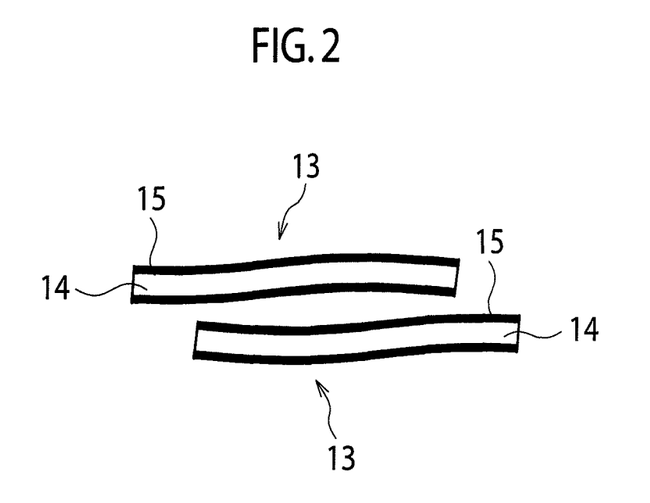
FIG. 2 is a view (a cross-sectional view of a core-sheath-structure resin short fiber) for explaining the filter medium and the filter medium manufacturing method according to the embodiment of the present invention.

In FIG. 2, core-sheath-construction resin short fibers each have a configuration including; as a core, a high-melting-point polyester fiber 14 which is the same as the high-melting-point polyester fiber 11; and, as a sheath, a low-melting-point polyester (a second resin) 15 with a fusing temperature of 200° C. (a second fusing temperature) which is lower than 220° C. (the first fusing temperature). The core-sheath-structure resin short fibers 13 have a fineness of, for example, 0.5 to 20 deniers (an optimum value is 1 to 6 deniers), and are cut to, for example, 20 to 100 mm in length.

Figure 3:
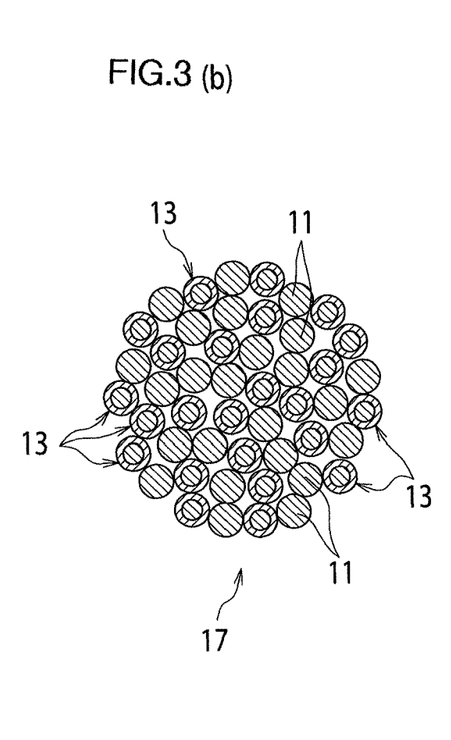

In FIG. 3, a twisted yarn 17 is made by blending the polyester fibers 11 and the core-sheath-structure resin short fibers 13 with a weight ratio of, for example, 7:3 to 1:9 (an optimum weight ratio is 4:6); and twisting these fibers with their directions aligned, so that the twisted yarn 17 has a fineness of, for example, 150 to 3000 deniers (an optimum value is 530 deniers).

Figure 4:
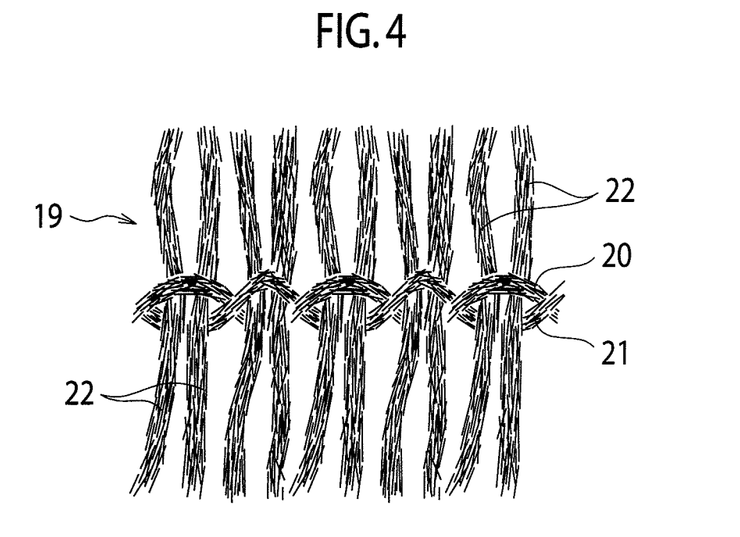
FIG. 4 is a view (a side view of a chenille yarn) for explaining the filter medium and the filter medium manufacturing method according to the embodiment of the present invention.

In FIG. 4, a chenille yarn 19 is made by twisting together a weldable core yarn 20 and a weldable binder yarn 21 while placing filament yarns 22 between the core yarn 20 and the binder yarn 21.

Figure 5:
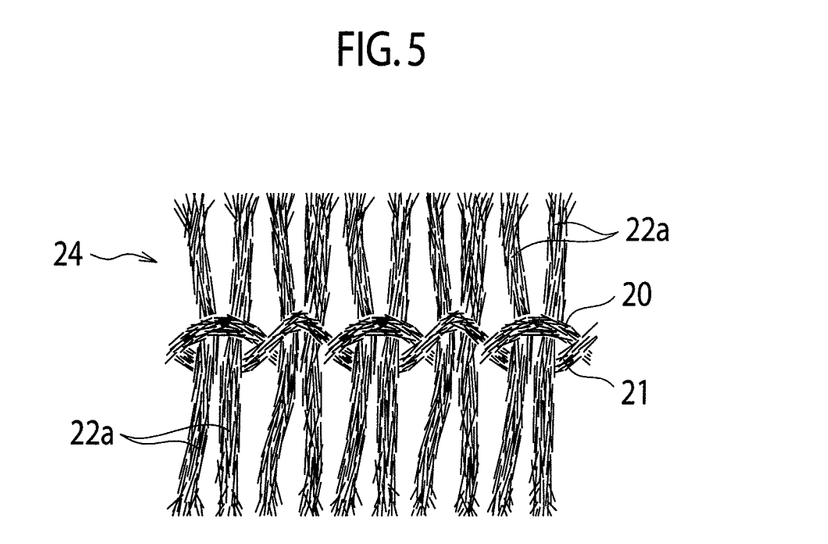
FIG. 5 is a view (a side view of the chenille yarn) for explaining the filter medium and the filter medium manufacturing method according to the embodiment of the present invention.

In FIG. 5, a chenille yarn 24 is made by forming the filament yarns 22 of the chenille yarn 19 into filament yarns 22*a* by cutting the filament yarns 22 to a predetermined length of, for example, 2 to 20 mm.

Figure 6:
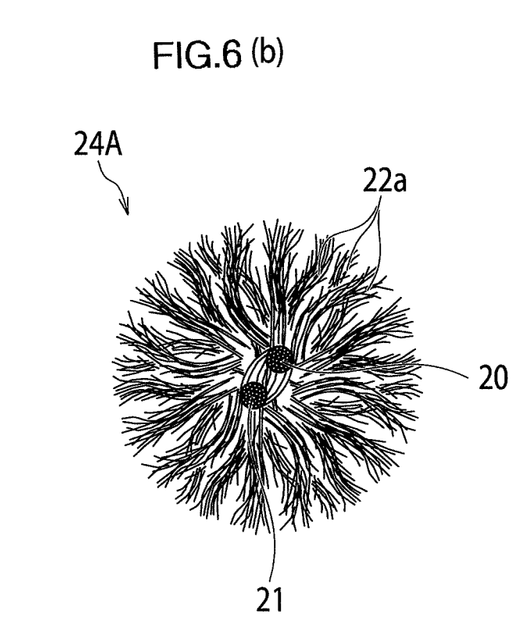

In FIG. 6, a chenille yarn 24A is made by heating the chenille yarn 24 to 200° C. (the second fusing temperature).

Figure 7:
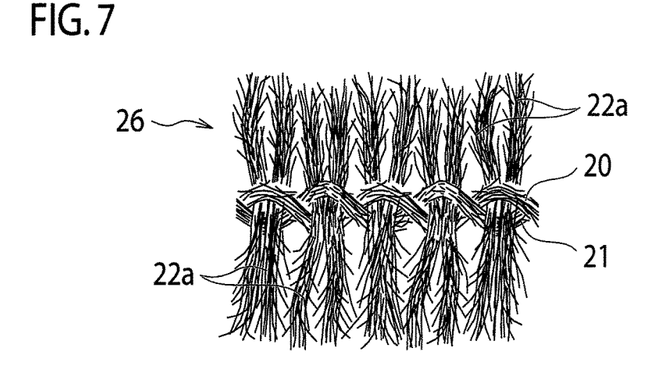
FIG. 7 is a view (a side view of the filter medium) for explaining the filter medium and the filter medium manufacturing method according to the embodiment of the present invention.

In FIG. 7, a filter medium 26 is made by cutting the heated chenille yarn 24A to a predetermined length. For example, the predetermined length is set to satisfy L/D=1 to 10 where L indicates the length of the filter medium (in a lateral direction on the sheet of FIG. 7) and D indicates the length of each filament yarn 22*a*.

Next, an example of the method of manufacturing the filter medium 26 is described with reference to FIGS. 1 to 7.

First of all, the polyester fibers 11 shown in FIG. 1 and the core-sheath-structure resin short fibers 13 shown in FIG. 2 are blended with the weight ratio of 7:3 to 1:9 (the optimum weight ratio is 4:6), and twisted with their directions aligned to form the twisted yarn 17 having the fineness of, for example, 150 to 3000 deniers (the optimum value is 530 deniers) as shown in Parts (a) and (b) of FIG. 3 (a twisted yarn manufacturing step).

Next, the twisted yarn 17 is used as the core yarn 20, the binder yarn 21, and the filament yarn 22. The core yarn 20 and the binder yarn 21 are twisted together while, for example, one to six filament yarns 22 are placed between the core yarn 20 and the binder yarn 21, whereby the chenille yarn 19 as shown in FIG. 4 is manufactured (a chenille yarn manufacturing step).

Then, the filament yarns 22 are cut to the predetermined length of, for example, 2 to 20 mm, whereby the chenille yarn is formed into the chenille yarn 24 having the filament yarns 22*a* as shown in FIG. 5 (a filament yarn cutting step).

At this step, the twist of each filament yarn 22*a* is loosened and spread slightly at its cut surface.

Thereafter, the chenille yarn 24 is heated to the second fusing temperature (200° C.) so that the core yarn 20, the binder yarn 21, and the filament yarns 22*a* are welded together and fuzzed. Thereby, the chenille yarn 24A as shown in parts (a) and (b) of FIG. 6 is formed (a heat welding step).

Heating the core yarn 20, the binder yarn 21, and the filament yarns 22*a* to the second fusing temperature (200° C.) in this manner softens the surface of the high-melting-point polyester fiber 11, which makes it easier to weld the high-melting-point polyester (the polyester fiber 11) and the low-melting-point polyester (the polyester fiber 15) together.

Specifically, of the high-melting-point polyester fibers and the core-sheath-structure resin short fibers 13 constituting the twisted yarn 17, the low-melting-point polyesters 15 which are the sheath portions of the core-sheath-structure resin short fibers 13 melt and weld the high-melting-point polyester fibers 11 and 14 together at their contact points inside and outside the twisted yarn 17.

Thereby, moderate voids are formed inside the twisted yarn 17, and end portions of the high-melting-point polyester fibers 11 and 14 not having melted are raised from the twisted yarn 17.

The cut surface of each filament yarn 22*a* is welded in a state with the ends spread slightly where the twist of the filament yarn 22*a* at the cut surface is loosened.

After that, the heated chenille yarn 24A is cut to the predetermined length (satisfying L/D=1 to 10, for example), thus forming the filter medium 26 shown in FIG. 7 having a relative density of 1.38 (a chenille yarn cutting step).

According to the method of manufacturing the filter medium 26 of the embodiment of the present invention, the core yarn 20, the binder yarn 21, and the filament yarns 22*a* being the short fibers are welded together densely and firmly inside and outside the core yarn 20, the binder yarn 21, and the filament yarns 22*a* by heating the chenille yarn 24 to the second fusing temperature (200° C.). This makes the filter medium 26 less likely to fray even when the chenille yarn 24A is cut to the predetermined length after the heat welding step, and makes the resin stable fibers constituting the filament yarns 22*a* and the twisted yarn 17 less likely to fall out with cleaning. As a consequence, the lifetime of the filter medium 26 can be increased.

In addition, heating the chenille yarn 24 to the second fusing temperature (200° C.) raises the resin short fibers constituting the core yarn 20, the binder yarn 21, and the filament yarns 22*a*, which can secure favorable porosity. Thus, suspended matters can be captured efficiently.

In the method of manufacturing the filter medium 26 above, the description has been given by: using the high-melting-point polyester resins as the first resins constituting the resin short fibers and the resins constituting the cores of the core-sheath-structure resin short fibers; and using the low-melting-point polyester resins as the second resins constituting the sheaths of the core-sheath-structure resin short fibers. However, it is also possible to manufacture a filter medium having a relative density of 0.91 by: using high-melting-point polypropylene resins with a fusing temperature (a first fusing temperature) of, for example, 140° C., as the resins constituting the resin short fibers and the resins constituting the cores of the core-sheath-structure resin short fibers; using low-melting-point polypropylene resins with a fusing temperature (a second fusing temperature) of, for example, 115° C., as the resins constituting the sheaths of the core-sheath-structure resin short fibers; and making the other conditions the same as the conditions for manufacturing the filter medium 26. This manufacturing method can achieve the same effect as the method of manufacturing the filter medium 26 described above.

Further, the description has been given by: using the high-melting-point polyester resins or the high-melting-point polypropylene resins as the first resins constituting the resin short fibers and the resins constituting the cores of the core-sheath-structure resin short fibers; and using the low-melting-point polyester resins or the low-melting-point polypropylene resins as the second resins constituting the sheaths of the core-sheath-structure resin short fibers, that is, by: using the resins of the same family (the same kind). However, the first resins and the second resins do not necessarily have to be the resins of the same family (the same kind) as long as: the first resins with the first fusing temperature constituting the resin short fibers and the second resins with the second fusing temperature (the temperature lower than the first fusing temperature) constituting the sheaths of the core-sheath-structure resin short fibers are both weldable; and the surfaces of the first resins are designed to be softened at the second fusing temperature. For example, it is also possible to use polypropylene resins as the first resins and use polyethylene resins as the second resins.

In this case, the second fusing temperature of the second resins constituting the sheaths of the core-sheath-structure resin short fibers is made lower than the first fusing temperature of the first resins constituting the resin short fibers and the third fusing temperature of the third resins constituting the cores of the core-sheath-structure resin short fibers is made equal to or higher than the second fusing temperature of the second resins. Thereby, deformation of the core-sheath-structure resin short fibers can be suppressed and an intended filter medium as designed can be achieved.

Furthermore, the description has been given by: using the weldable twisted yarns as the core yarn 20 and the binder yarn 21. However, the same effect as above can be achieved as long as at least one of the core yarn 20 or the binder yarn 21 is weldable with the filament yarn 22*a*. For example, a twisted yarn formed only of low-melting-point and non-weldable first resins or third resins may be used as the core yarn 20 or the binder yarn 21.

Figure 8:
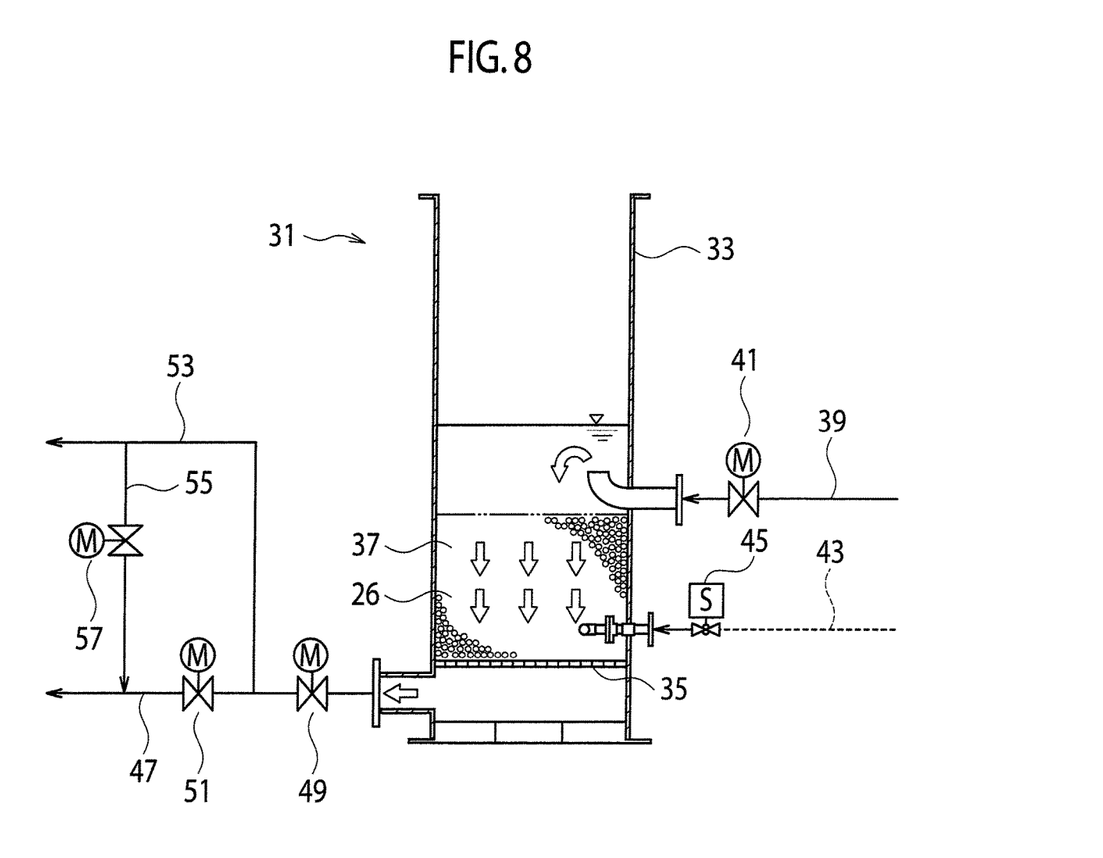
FIG. 8 is a schematic configuration diagram showing a filtering device according to the embodiment of the present invention.

FIG. 8 is a schematic configuration diagram showing a filtering device according to the embodiment of the present invention. The same portions as those of FIGS. 1 to 7 are given the same reference numerals and description thereof is omitted.

In FIG. 8, a downflow filtering device 31 includes: a filtration tank 33; a to-be-treated liquid feed pipe 39 configured to feed a liquid to be treated (water to be treated) to the inside of the filtration tank 33; an air feed pipe 43 configured to feed air for cleaning/stirring to the inside of the filtration tank 33; and a piping system configured to discharge a treated liquid (treated water) or a used cleaning liquid (used cleaning water) from the filtration tank 33.

In the filtration tank 33, a filter media outflow prevention screen 35 configured to prevent the filter media 26 from flowing out is disposed at a certain height from its bottom end.

Above the filter media outflow prevention screen 35, a filter medium layer 37 of a certain thickness is formed with the filter media 26.

The to-be-treated liquid feed pipe 39 is connected to the filtration tank 33 in such a way as to feed the water to be treated to a point above the filter medium layer 37.

The to-be-treated liquid feed pipe 39 is provided with an on-off valve 41 configured to control the water to be treated which is to be fed to the inside of the filtration tank 33.

The air feed pipe 43 is connected to the filtration tank 33 at a position corresponding to a lower portion of the filter medium layer 37, i.e., corresponding to a portion above the filter media outflow prevention screen 35 so that the air fed by the air feed pipe can stir and clean the filter media 26 constituting the filter medium layer 37.

The air feed pipe 43 is provided with an on-off valve 45 configured to control air which is to be fed to the inside of the filter medium layer 37.

A discharge pipe 47 configured to discharge the liquid to be treated (water to be treated) and the like is connected to the filtration tank 33 at a portion below the filter media outflow prevention screen 35.

The discharge pipe 47 is provided with two on-off valves 49 and 51 configured to control the rate of flow from the upstream to the downstream.

A treated liquid discharge pipe 53 configured to discharge the treated liquid (treated water) is connected to the discharge pipe 47 at a position between the on-off valves 49 and 51.

A discarded treated liquid pipe 55 is connected to the treated liquid discharge pipe 53 and to the discharge pipe 47 at a position downstream of the on-off valve 51. The discarded treated liquid pipe 55 is provided with an on-off valve 57 configured to control the flow rate of discarded treated water.

Next, description is given of a filtration example in the filtering device 31.

First of all, the on-off valves 45 and 57 are closed and the on-off valves 41, 49, and 51 are opened.

Then, the water to be treated is fed to the inside of the filtration tank 33 through the to-be-treated liquid feed pipe 39. The water to be treated thus fed is filtered while moving downward inside the filter medium layer 37, and is discharged through the discharge pipe 47.

If the treated water obtained through the discharge pipe 47 meets a predetermined criterion after the filtration is started in this manner, the treated water is fed to an intended place through the treated liquid discharge pipe 53 by closing the on-off valve 51.

In the case of: stopping the feeding of the treated water to the intended place; or terminating the filtration process and discharging treated water and the like from the filtration tank 33, the water to be treated and the like are discharged by opening the on-off valve 57.

For example, in the case where pressure drop is increased by clogging due to suspended matters captured in the filter medium layer 37, or where cumulative operation hours reach a predetermined duration, or where the treated water no longer meets the predetermined criterion, air is fed by opening the on-off valve 45 and the on-off valve 51 is opened.

When the water to be treated and the air are fed to the inside of the filtration tank 33, the filter media 26 are stirred by the air and cleaned. Thereby, suspended matters captured in the filter media 26 is detached from the filter media 26, goes down, and is discharged through the discharge pipe 47.

The on-off valve 45 is closed after the filter media 26 are cleaned for a predetermined period. The filtration process described above can be thereby started with an initial condition.

As a cleaning liquid (cleaning water) to be fed to the inside of the filtration tank 33 when the filter media 26 are cleaned, cleaning water, e.g. the treated liquid (treated water), which meets a predetermined criterion, may be fed.

The device may be configured such that the filter media 26 are cleaned by feeding air after stopping the feeding of the water to be treated or the treated water, and a used cleaning liquid (used cleaning water) is discharged through the discharge pipe 47 by opening the on-off valves 49 and 51.

According to the filtering device 31 of the embodiment of the present invention, the filter medium 26 having the fuzzy filament yarns captures suspended matters efficiently. This enables efficient filtration of the water to be treated.

Since the filter medium 26 is in the form of a woolly worm and easy to clean, large cleaning force (stirring force) is not required, making it possible to reduce power for cleaning.

Since the filter medium 26 has a small fineness (thin), it has a high capturing capability for suspended matters.

When the filter medium layer 37 is formed using the filter media 26, the filter media 26 are packed while their filament yarn portions are compressed moderately. This makes it possible to keep the voids between the filter media 26 uniform and to perform the filtration efficiently.

Figure 9:
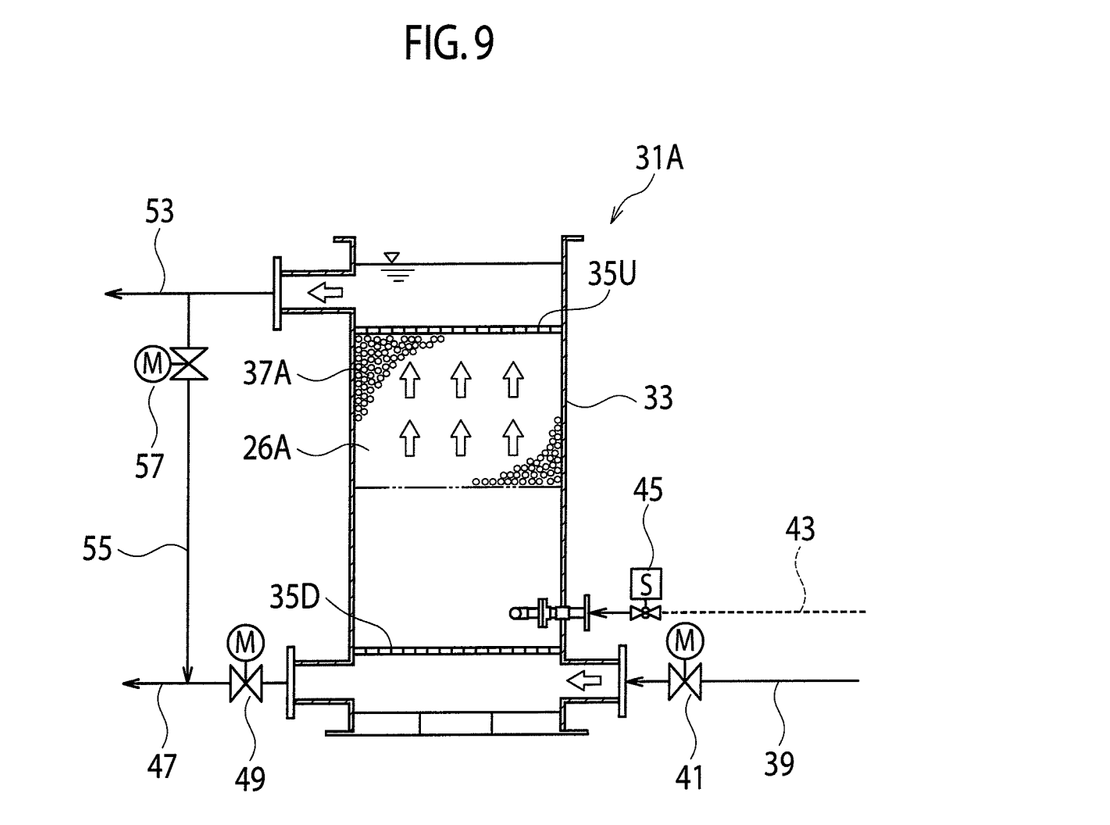
FIG. 9 is a schematic configuration diagram showing a filtering device according to a different embodiment of the present invention.

FIG. 9 is a schematic configuration diagram showing a filtering device according to a different embodiment of the present invention. The same portions or equivalent portions as those of FIGS. 1 to 8 are given the same reference numerals and description thereof is omitted as needed.

In FIG. 9, an upflow filtering device 31A includes: a filtration tank 33; a to-be-treated liquid feed pipe 39 configured to feed a liquid to be treated (water to be treated) to the inside of the filtration tank 33; an air feed pipe 43 configured to feed air for cleaning/stirring to the inside of the filtration tank 33; and a piping system configured to discharge a treated liquid (treated water) or a used cleaning liquid (used cleaning water) from the filtration tank 33.

In the filtration tank 33, a lower filter media outflow prevention screen 35D configured to prevent filter media from flowing out is disposed at a certain height from its bottom end, and an upper filter media outflow prevention screen 35U configured to prevent the filter media from flowing out is disposed at a certain height from its top end.

Below the upper filter media outflow prevention screen 35U, a filter medium layer 37A of a certain thickness is formed from the filter media 26.

The to-be-treated liquid feed pipe 39 is connected to the filtration tank 33 in such a way as to feed the water to be treated to a point below the lower filter media outflow prevention screen 35D.

The air feed pipe 43 is connected to the filtration tank 33 at a position corresponding to a portion above the lower filter media outflow prevention screen 35D so that the air fed by the air feed pipe can stir and clean the filter media 26 constituting the filter medium layer 37A.

A discharge pipe 47 configured to discharge the liquid to be treated (water to be treated) and the like is connected to the filtration tank 33 at a portion below the lower filter media outflow prevention screen 35D.

A treated liquid discharge pipe 53 configured to discharge the treated liquid (treated water) is connected to the filtration tank 33 at a position above the upper filter media outflow prevention screen 35U.

The filter medium used in the filtering device 31A is a filter medium 26A having a relative density of 0.91 as described above. Specifically, the filter medium 26A is manufactured by: using high-melting-point polypropylene resins with a fusing temperature (a first fusing temperature) of, for example, 140° C., as the resins constituting the resin short fibers and the resins constituting the cores of the core-sheath-structure resin short fibers; using low-melting-point polypropylene resins with a fusing temperature (a second fusing temperature) of, for example, 115° C., as the resins constituting the sheaths of the core-sheath-structure resin short fibers; and making the other conditions the same as the conditions for manufacturing the filter medium 26.

Next, description is given of a filtration example in the filtering device 31A.

First of all, on-off valves 45 and 49 are closed and on-off valves 41 and 57 are opened.

Then, the water to be treated is fed to the inside of the filtration tank 33 through the to-be-treated liquid feed pipe 39. The water to be treated thus fed is filtered while moving upward inside the filter medium layer 37A, and is discharged through the treated liquid discharge pipe 53, a discarded treated liquid pipe 55, and the discharge pipe 47.

If the treated water obtained through the discharge pipe 47 meets a predetermined criterion after the filtration is started in this manner, the treated water is fed to an intended place through the treated liquid discharge pipe 53 by closing the on-off valve 57.

Meanwhile, in the case of stopping the feeding of the treated water to the intended place, the water to be treated is discharged by opening the on-off valve 57.

For example, in the case where pressure drop is increased by clogging due to suspended matters captured in the filter medium layer 37A, or where cumulative operation hours reach a predetermined duration, or where the treated water no longer meets the predetermined criterion, air is fed by opening the on-off valve 45 and the on-off valve 57 is opened.

When the water to be treated and the air are fed to the inside of the filtration tank 33, the filter media 26A are stirred by the air and cleaned. Thereby, suspended matters captured in the filter media 26A is detached from the filter media 26, goes up, and is discharged through the treated liquid discharge pipe 53, the discarded treated liquid pipe 55, and the discharge pipe 47.

The on-off valve 57 is closed after the filter media 26A are cleaned for a predetermined period. The filtration process described above can be thereby started in an initial condition.

Note that as a cleaning liquid (cleaning water) to be fed to the inside of the filtration tank 33 when the filter media 26A are cleaned, cleaning water, e.g. a treated liquid (treated water), which meets a predetermined criterion, may be fed.

In addition, the device may be configured such that the filter media 26A are cleaned by feeding air after stopping the feeding of the water to be treated or the treated water, and a used cleaning liquid (used cleaning water) is discharged through the discharge pipe 47 by opening the on-off valve 49.

Figure 10:
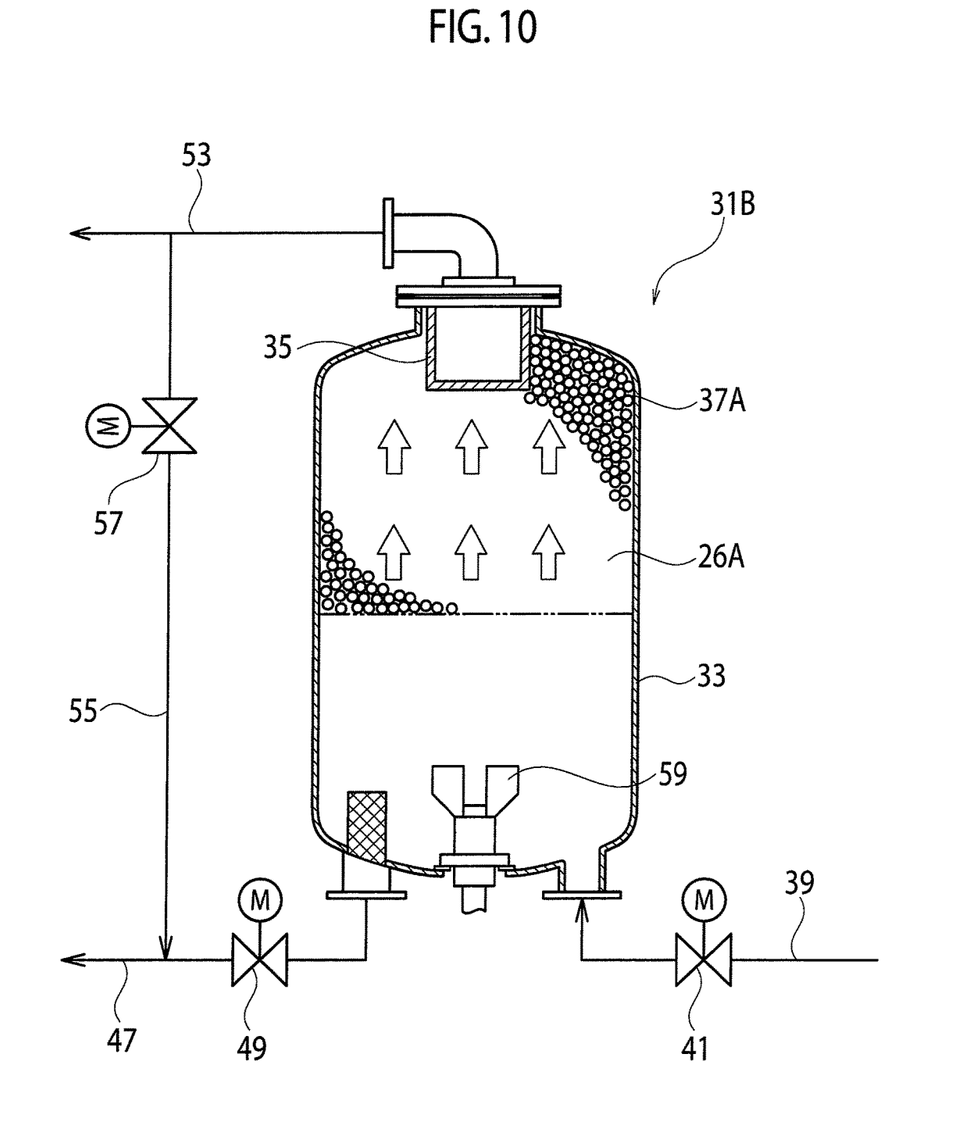
FIG. 10 is a schematic configuration diagram showing a filtering device according to a still different embodiment of the present invention.

The filtering device 31A of the present invention can achieve the same effect as that of the filtering device 31 of the embodiment described previously. The filter media 26A are also applicable to a conventional closed upflow filtering device 31B as shown in FIG. 10 and can exert the filtration performance in this device in the same manner as in the filtering device 31. Besides, cleaning the filter media 26A with a stir blade 59 can achieve the same cleaning effect as that in the filtering device 31.

Although the embodiments of the present invention have been described above, the present invention is not limited to the above embodiments but various modifications are possible.

The invention claimed is:

1. A filter medium comprising:
    a core yarn and a binder yarn twisted together, at least one of the core yarn or the binder yarn being weldable; and
    a filament yarn being fuzzy and weldable, the filament yarn including first short fibers, the first short fibers twisted and raised at ends thereof,
    the filament yarn being welded to at least one of the core yarn or the binder yarn while being placed between the core yarn and the binder yarn as twisted together, wherein
    the at least one of the core yarn or the binder yarn includes second short fibers,
    weldability of the filament yarn is derived from melting of the first short fibers, and
    weldability of the at least one of the core yarn or the binder yarn is derived from melting of the second short fibers, and
    the filament yarn being welded to at least one of the core yarn or the binder yarn comprises the first short fibers of the filament yarn being fused to the second short fibers of the at least one of the core yarn or the binder yarn by melting of the first short fibers and the second short fibers.

2. The filter medium according to claim 1, wherein the filament yarn and at least one of the core yarn or the binder yarn include a twisted yarn including a resin short fiber and a core-sheath-structure resin short fiber, the resin short fiber and the core-sheath-structure resin short fiber twisted together with directions of the resin short fiber and the core-sheath-structure resin short fiber being aligned, the resin short fiber including a first resin having a melting point of a first fusing temperature, the core-sheath-structure resin short fiber including a second resin as a sheath having a melting point of a second fusing temperature lower than the first fusing temperature and a third resin as a core having a melting point of a third fusing temperature equal to or higher than the second fusing temperature.

3. A filtering device for filtering a liquid to be treated with a filter medium layer provided in a filtration tank, wherein
    the filter medium layer includes filter media, and
    each of the filter media includes:
        a core yarn and a binder yarn twisted together, at least one of the core yarn or the binder yarn being weldable; and
        a filament yarn being fuzzy and weldable, the filament yarn including first short fibers, the first short fibers twisted and raised at ends thereof,
        the filament yarn being welded to at least one of the core yarn or the binder yarn while being placed between the core yarn and the binder yarn as twisted together,
        the at least one of the core yarn or the binder yarn includes second short fibers,
        weldability of the filament yarn is derived from melting of the first short fibers, and
        weldability of the at least one of the core yarn or the binder yarn is derived from melting of the second short fibers, and
        the filament yarn being welded to at least one of the core yarn or the binder yarn comprises the first short fibers of the filament yarn being fused to the second short fibers of the at least one of the core yarn or the binder yarn by melting of the first short fibers and the second short fibers.

4. The filtering device according to claim 3, wherein the filament yarn and at least one of the core yarn or the binder yarn include a twisted yarn including a resin short fiber and a core-sheath-structure resin short fiber, the resin short fiber and the core-sheath-structure resin short fiber twisted together with directions of the resin short fiber and the core-sheath-structure resin short fiber being aligned, the resin short fiber including a first resin having a melting point of a first fusing temperature, the core-sheath-structure resin short fiber including a second resin as a sheath having a melting point of a second fusing temperature lower than the first fusing temperature and a third resin as a core having a melting point of a third fusing temperature equal to or higher than the second fusing temperature.

5. The filter medium according to claim 1, wherein L/D=1 to 10 is satisfied where L indicates a length of the filter medium, and D indicates a length of the filament yarn.

6. The filtering device according to claim 3, wherein L/D=1 to 10 is satisfied where L indicates a length of the filter medium, and D indicates a length of the filament yarn.

* * * * *